July 4, 1950  S. D. POOL ET AL  2,513,966
PICK-UP ATTACHMENT FOR HARVESTERS
Filed Oct. 25, 1946  2 Sheets-Sheet 1

Inventors
Stuart D. Pool
Gilbert W. Pearson
By Paul O. Pippel
Atty.

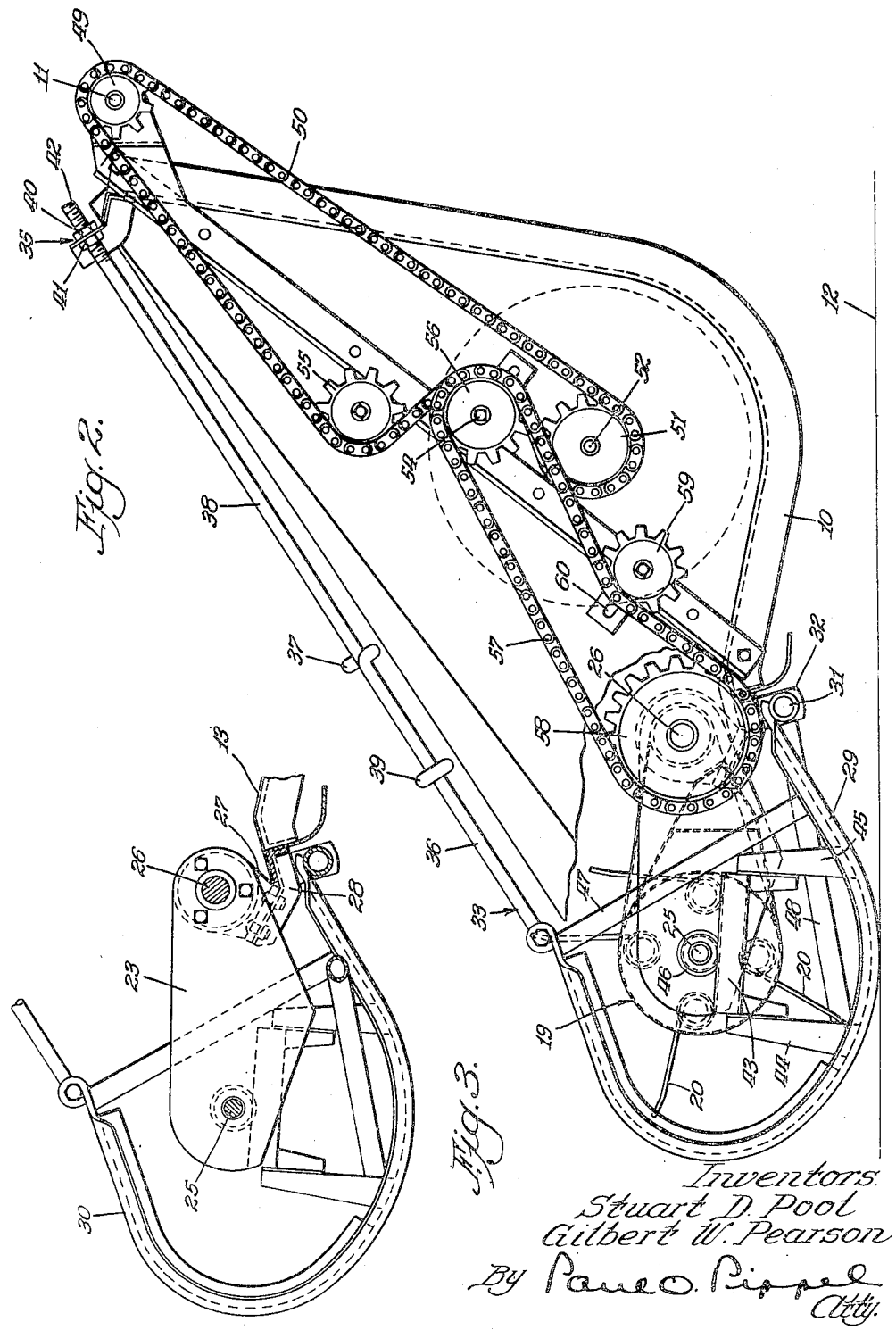

Patented July 4, 1950

2,513,966

UNITED STATES PATENT OFFICE 2,513,966

PICKUP ATTACHMENT FOR HARVESTERS

Stuart D. Pool and Gilbert W. Pearson, Moline, Ill., assignors to International Harvester Company, a corporation of New Jersey Application October 25, 1946, Serial No. 705,522

11 Claims. (Cl. 56—364)

This invention relates to a new and improved pick-up attachment for harvesters and has for one of its principal objects the provision of means for floating the pick-up with respect to the regular harvester platform.

An important object of this invention is to provide an arcuately floatable pick-up for attachment to the forward end of a harvester thresher platform.

Another object of this invention is to provide a ground-engaging runner structure adapted to follow the contour of the ground and carry a pick-up in such a manner that the pick-up and runner may have relative movement.

Harvester threshers in recent years have used a scoop-shovel type of platform which is pivoted for vertical adjustment at a point relatively high on the machine. Prior to this, combine platforms were provided for pivotal movement on a substantially horizontal level with the platform. When a pick-up attachment was applied to these relatively horizontal platforms, it was permitted and would float about the platform hinge. Now, however, if the pick-up were to be rigidly attached to the forward end of the scoop-shovel type of platform the hinge point of the platform would be too high to permit floating movement to follow the contour of the ground, and for that reason provision has been made to mount the pick-up attachment for separate floating movement with respect to the platform.

It is an object of this invention, therefore, to maintain the hinge point of the pick-up on a substantially horizontal line with the pick-up cylinder. This enables the pick-up to easily swing upwardly upon striking an obstruction rather than to become embedded in the ground because of a high hinge point.

A still further object of this invention is to provide a runner or skid structure hingedly attached to the forward end of a scoop shovel type of harvester thresher platform, a separate pick-up attachment hinged to the platform at a point spaced from the hinge attachment of the runner structure, and a means provided between the runner structure and pick-up attachment to raise and lower the pick-up upon corresponding movement of the runner structure.

Other and further important objects of this invention will become apparent from the following specification and accompanying drawings, in which:

Figure 2 is a side elevational view partially in section of the device as shown in Figure 1.

Figure 3 is a detail sectional view taken on the line 3—3 of Figure 1.

As shown in the drawings:

Figure 1:
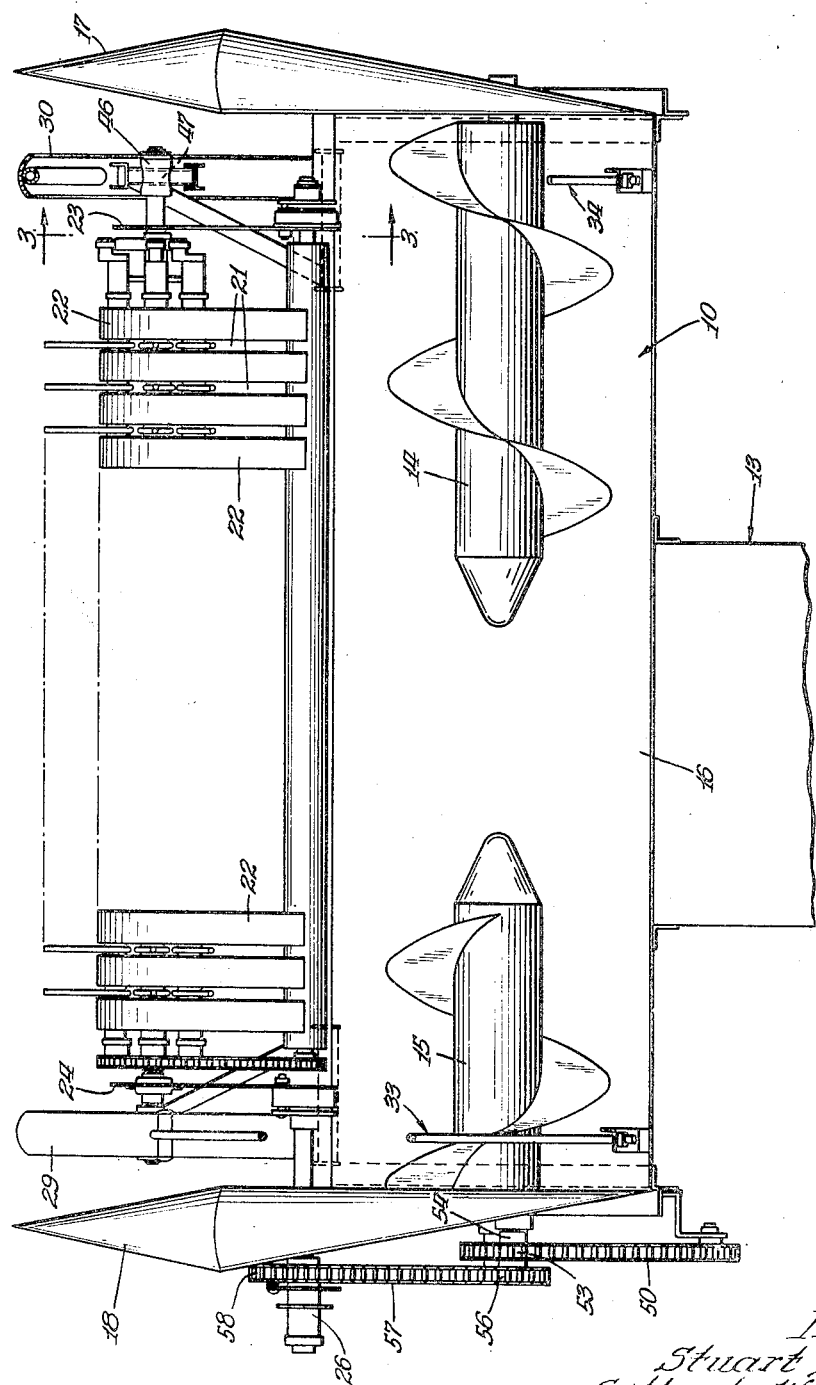
Figure 1 is a top plan view of the pick-up attachment for a harvester thresher.

The reference numeral 10 indicates generally a scoop-shovel type of platform associated with grain harvesting machines such as harvester threshers. The platform 10 is hingedly mounted about a shaft 11 positioned at a considerable height above the ground line 12 on the forward end of a threshing unit 13. This platform has opposed auger conveyors 14 and 15 adapted to carry the material centrally thereof for elevation up the narrow rearwardly inclined portion 16 of the scoop shovel platform 10 to the thresher unit 13. Ordinarily a sickle is positioned along the forward edge of the wide platform 10. Divider points 17 and 18 are positioned at each end of the platform 13. On numerous occasions, however, the harvester thresher is used to thresh grain previously cut and left in windrows in the field. In such event it is necessary to provide a means for picking up the windrows and conveying the previously cut grain to the augers 14 and 15 in much the same manner as standing grain is dropped into the augers 14 and 15, by a forward movement of the sickle through a standing crop. The pick-up attachment includes a cylinder 19 having radially extending spring-mounted fingers 20 adapted to rotate through parallel slots 21 formed between guide strips 22, which extend from a position beneath the cylinder 19 up over and rearwardly to a position over the platform 13. The radially extending fingers 20 project upwardly through the slots 21 between the strips 22, and when the cylinder 19 is rotated in a clockwise direction as viewed in Figure 2, the fingers will pick up crops from a windrow and carry it up and over on the guide strips 22, and continued movement of successive portions of the crop will push the material into the augers 14 and 15, whereupon it is elevated into the threshing mechanism.

It has been found impossible to rigidly attach a pick-up to the forward end of a platform such as shown at 10, for the reason that the cylinder and spring fingers 20 would be severely damaged upon running into any obstruction or any variations in the surface of the ground, as the cylinder would tend to bury itself because of the high hinge shaft 11 of the platform 10. As best shown in Figure 3 the pick-up cylinder 19 is mounted on arms 23 and 24. A cylinder shaft 25 joins the arms 23 and 24 at their forward ends, and the arms extend rearwardly and are journally mounted on a hinge shaft 26. The hinge shaft 26 is carried in bearings 27 supported on bracket members 28 attached to the forward end of the wide platform 10. The pick-up cylinder 19 is therefore provided with a hinge attachment on substantially the same level as the position of the cylinder, and hence when an obstruction is encountered the cylinder is permitted to swing freely upwardly.

A runner or skid structure consisting of spaced U-shaped members 29 and 30 and including a hinge shaft 31 for joining the spaced members is adapted to ride and slide over the surface of the ground responding to variations in the ground surface by movement in direct proportion to the variations. The hinge shaft 31 is mounted on brackets 32 depending from the under side of the platform 10 and beneath the hinge shaft 26 for the pick-up cylinder 19. The U-shaped members 29 and 30 extend forwardly and downwardly beneath the cylinder 19 and thence upwardly and over the cylinder. At a point above the cylinder 19 the U-shaped members are joined by limit extension members 33 and 34. These limit extension members 33 and 34 project upwardly and rearwardly to a fixed attachment at 35 at the upper end of the platform 10. The members 33 and 34 consist of a lower portion 36 terminating in a loop 37 and an upper portion 38 terminating in a loop 39. The member 36 slides within the loop 39 and the member 38 slides within the loop 37. For all normal arcuately swingable movement of the runner structure, the loop members 37 and 39 will remain spaced apart as shown in Figure 2. However, should the pick-up cylinder be driven over a relatively deep ditch or other hole, the runner structure would be limited in its downward swinging movement by reason of the loop 37 engaging the loop 39 for the lowermost limit of the runner structure. The position of the loop 39 remains fixed except for adjusting movement at the point 35 by movement of the lock nuts 40 and 41 on the threaded upper end 42 of the member 38.

As previously stated the pick-up cylinder on its arms 23 and 24 and the runner structure are separately mounted for hinging movement on the platform 10. Movement of the runner structure is occasioned by engagement with the ground. However, the pick-up cylinder must not engage the ground inasmuch as such engagement would cause damage to the pick-up fingers 20. The runner structure is equipped with a longitudinally extending track member 43 on each of the U-shaped members 29 and 30. The track 43 is spaced above the ground-engaging portion of the U members 29 and 30 by vertical posts 44 and 45. The track 43 is of tubular construction and is supported at its front and rear ends on the posts 44 and 45 respectively. Track-engaging rollers 46 are mounted on the cylinder shaft 25 at spaced points in alinement with the track members 43 directly above the U-shaped runners 29 and 30. The rollers 46 are annularly concaved as shown at 47 in Figure 1. This concavity in the rollers maintains the pick-up cylinder in fixed lateral position with respect to the runner structure. The tracks 43 are positioned at such a height that when the cylinder rides thereon the lower ends of the fingers 20 will clear the ground. As the runner structure swings about the hinge 31 the tracks 43 move upwardly or downwardly dependent upon the movement of the runner structure, and hence the pick-up cylinder and its rollers 46 will move correspondingly upwardly or downwardly. Inasmuch as the centers of arcuate movement are not identical, the rollers 46 will necessarily roll along the tracks 43 to compensate for the difference in movement between the runner structure and the pick-up cylinder. It has been found to be advantageous to separate the two members for the reason that the runner structure must be hinged at a relatively low point and must contact the ground, whereas the pick-up cylinder must be hinged slightly above the center of the cylinder so that it will not tend to yield in picking up the windrow grain.

The runner structure includes brace members 47 and 48. The brace or spacer member 47 maintains the upper ends of the U-shaped runners fixedly spaced apart, and the member 48 aids in reenforcing the lower portion of the runner structure which receives the greatest amount of stresses and strains.

The hinge shaft 11 carries a driving sprocket 49 which is adapted to drive all the elements on the harvester thresher or combine platform including the pick-up attachment. A chain 50 driven by the sprocket 49 is adapted to impart drive to a sprocket 51 on a shaft 52 carrying the auger conveyor 15 which is unjournaled at its ends approaching the center of the platform 10. The chain 50 continues around a sprocket 53 on the shaft 54. An idler sprocket 55 causes the chain 50 to remain in engagement with the sprocket 53, and thereupon the chain 50 continues back to the initial driving sprocket 49. A second sprocket 56 is fastened to the shaft 54 and carries a chain 57 down around a sprocket 58 fastened to the shaft 26 about which the pick-up attachment is arcuately hinged. The chain 57 then proceeds over an idler sprocket 59 which is mounted for adjustable movement in a slot 60 so that the chain 52 may be tightened or loosened as desired.

It will be obvious that in the operation of the machine the runner structure closely follows the irregularities in the ground and transmits these irregularities directly and immediately to the pick-up cylinder which is carried by the tracks 43 on the runner structure. The pick up cylinder is permitted relative longitudinal movement with respect to the runner structure but is prohibited from relative transverse movement by engagement of the rollers 46 with the tracks 43. The fingers 20 of the pick-up cylinder are rotated about the shaft 25 by means of the drive shown in Figures 1 and 2. The pick-up fingers pick up grain lying in a windrow and turn it over onto the top thereof formed by a plurality of spaced guide strips 22. As stated above, this material is pushed rearwardly until it is taken by the augers 14 and 15 which carry it centrally of the platform 10 and thence to the threshing unit 13.

Numerous details of construction may be varied throughout a wide range without departing from the principles disclosed herein, and we therefore do not propose limiting the patent granted hereon otherwise than as necessitated by the appended claims.

What is claimed is:

1. A pick-up attachment for agricultural implements having a forwardly extending platform, a supporting runner hingedly mounted on said platform for floating movement thereabout, comprising a pick-up cylinder hingedly mounted for arcuate movement on and about said platform separately from said supporting runner, and means between the runner and the pick-up cylinder to cause a movement of the latter corresponding in direction to movements of the former.

2. A pick-up attachment for agricultural implements having a forwardly extending platform, a supporting runner hingedly mounted on said platform for floating movement thereabout, comprising a pick-up cylinder hingedly mounted for arcuate movement on and about said platform separately from said supporting runner, and means between the runner and the pick-up cylinder to cause a raising or a lowering of the latter by corresponding movements of the former, said means including a track structure on the supporting runner and track engaging rollers mounted on said pick-up cylinder and positioned on said track structure, whereby the separate arcuate movements of the runner and cylinder are permitted by relative movement of the track structure and track rollers.

3. A pick-up attachment for harvesting machines having a forwardly extending platform, comprising a pick-up cylinder mounted on a pair of arms, said arms hingedly mounted on said platform and extending forwardly thereof, a ground runner structure hingedly mounted on the forward end of the platform at a point spaced from the hinging attachment of the pick-up cylinder, and means arranged and constructed between said runner and said cylinder, whereby arcuate hinging movement of the ground runner structure will impart a corresponding movement to the cylinder.

4. A pick-up attachment for harvesting machines having a relatively highly hinged forwardly extending platform, comprising a pick-up cylinder mounted on a pair of arms, said arms hingedly mounted on said platform at a point relatively low on the platform and extending forwardly thereof, a ground runner structure hingedly mounted on the forward end of the platform at a point spaced from the hinging attachment of the pick-up cylinder, and means arranged and constructed between said runner and said cylinder whereby arcuate hinging movement of the ground runner structure will impart a corresponding movement to the cylinder.

5. A pick-up attachment for harvesting machines having a relatively highly hinged forwardly extending platform, comprising a pick-up cylinder mounted on a pair of arms, said arms hingedly mounted on said platform at a point relatively low on the platform and extending forwardly thereof, a ground runner structure hingedly mounted on the forward end of the platform at a point spaced below the hinging attachment of the pick-up cylinder, and means arranged and constructed between said runner and said cylinder, whereby arcuate hinging movement of the ground runner structure will impart a corresponding movement to the cylinder.

6. A pick-up attachment for harvesting machines having a relatively highly hinged forwardly extending platform, comprising a pick-up cylinder mounted on a pair of arms, said arms hingedly mounted on said platform at a point relatively low on the platform and extending forwardly thereof, a ground runner structure hingedly mounted on the forward end of the platform at a point spaced below the hinging attachment of the pick-up cylinder, means arranged and constructed between said runner and said cylinder, whereby arcuate hinging movement of the ground runner sturcture will impart a corresponding movement to the cylinder, said means including a track means and a track roller means, and means limiting the range of swinging hinging movement of the ground runner structure.

7. A pick-up attachment for harvesting machines having a relatively highly hinged forwardly extending platform, comprising a pick-up cylinder mounted on a pair of arms, said arms hingedly mounted on said platform at a point relatively low on the platform and extending forwardly thereof, a ground runner structure hingedly mounted on the forward end of the platform at a point spaced below the hinging attachment of the pick-up cylinder, means arranged and constructed between said runner and said cylinder, whereby arcuate hinging movement of the ground runner structure will impart a corresponding movement to the cylinder, said means including a track means on said ground runner structure and track roller means on said pick-up cylinder, said roller means adapted to be supported by and roll over said track means, whereby spaced arcuate movement of the runner structure and the cylinder is permitted, and means limiting the range of hinging movement of the ground runner structure.

8. A pick-up attachment for harvesting machines having a relatively highly hinged forwardly extending platform, comprising a pick-up cylinder mounted on a pair of arms, said arms hingedly mounted on said platform at a point relatively low on the platform and extending forwardly thereof, a ground runner structure hingedly mounted on the forward end of the platform at a point spaced below the hinging attachment of the pick-up cylinder, means arranged and constructed between said runner and said cylinder, whereby arcuate hinging movement of the ground runner structure will impart a corresponding movement to the cylinder, said means including a track means on said ground runner structure and track roller means on said pick-up cylinder, said roller means adapted to be supported by and roll over said track means, whereby spaced arcuate movement of the runner structure and the cylinder is permitted, means for driving the pick-up cylinder without interference with the arcuate hinging movement, and means limiting the range of hinging movement of the ground runner structure.

9. A pick-up attachment for harvesting machines having a forwardly extending platform, comprising a pick-up cylinder mounted on a pair of arms, said arms hingedly mounted on said platform and extending forwardly thereof, a ground runner structure hingedly mounted on the forward end of the platform at a point spaced from the hinging attachment of the pick-up cylinder, and means arranged and constructed between said runer and said cylinder, whereby arcuate hinging movement of the ground runner structure will impart a corresponding movement to the cylinder, said ground runner structure including spaced U-shaped members, one arm of each of said U-shaped members being hinged to the platform and constituting the runner structure hinge, limit extension members carried by the platform at a point above the hinge and arranged and constructed to support the upper ends of said U-shaped members.

10. A pick-up attachment for harvesting machines having a forwardly extending platform, comprising a pick-up cylinder mounted on a pair of arms, said arms hingedly mounted on said platform and extending forwardly thereof, a ground runner structure hingedly mounted on the forward end of the platform at a point spaced from the hinging attachment of the pick-up cylinder, and means arranged and constructed between said runner and said cylinder, whereby arcuate hinging movement of the ground runner structure will impart a corresponding movement to the cylinder, said ground runner structure including spaced U-shaped members, one arm of each of said U-shaped members being hinged to the platform and constituting the runner structure hinge, limit extension members carried by the platform at a point above the hinge and arranged and constructed to support the upper ends of said U-shaped members and said means including a track means on said ground runner structure and track roller means on said pick-up cylinder, said roller means adapted to be supported by and roll over said track means, whereby spaced arcuate movement of the runner structure and the cylinder is permitted.

11. A pick-up attachment for agricultural implements having a forwardly extending platform, comprising a pick-up cylinder hingedly mounted for arcuate movement on and about said platform, a supporting runner for said pick-up cylinder hingedly mounted on said platform at a point below and to the rear of the hinge mounting of said pick-up cylinder, and means between the runner and the pick-up cylinder to cause a movement of the latter corresponding in direction to movements of the former.

STUART D. POOL.
GILBERT W. PEARSON.

REFERENCES CITED

The following references are of record in the file of this patent:

UNITED STATES PATENTS

| Number | Name | Date |
| --- | --- | --- |
| 1,951,444 | Sands | Mar. 20, 1934 |
| 2,363,888 | Martin | Nov. 28, 1944 |